(12) United States Patent
Zhang (10) Patent No.: US 11,960,506 B2
(45) Date of Patent: Apr. 16, 2024

(54) DATA PROCESSING METHOD AND SYSTEM FOR CLOUD PLATFORM, AND ELECTRONIC APPARATUS AND STORAGE MEDIUM

(71) Applicant: INSPUR SUZHOU INTELLIGENT TECHNOLOGY CO., LTD, Jiangsu (CN)

(72) Inventor: Lianfa Zhang, Jiangsu (CN)

(73) Assignee: INSPUR SUZHOU INTELLIGENT TECHNOLOGY CO., LTD, Jiangsu (CN)

(*) Notice: Subject to any disclaimer, the term of this patent is extended or adjusted under 35 U.S.C. 154(b) by 0 days.

(21) Appl. No.: 18/013,517

(22) PCT Filed: Jul. 26, 2021

(86) PCT No.: PCT/CN2021/109241
§ 371 (c)(1),
(2) Date: Dec. 28, 2022

(87) PCT Pub. No.: WO2022/048356
PCT Pub. Date: Mar. 10, 2022

(65) Prior Publication Data
US 2023/0289369 A1  Sep. 14, 2023

(30) Foreign Application Priority Data
Sep. 4, 2020 (CN) .......... 202010922963.2

(51) Int. Cl.
*G06F 16/27* (2019.01)
*G06F 11/14* (2006.01)
(Continued)

(52) U.S. Cl.
CPC ........ *G06F 16/278* (2019.01); *G06F 11/1402* (2013.01); *G06F 11/3433* (2013.01); *G06F 16/2282* (2019.01); *G06F 2201/80* (2013.01)

(58) Field of Classification Search
None
See application file for complete search history.

(56) References Cited

U.S. PATENT DOCUMENTS 10,285,064 B2    5/2019   Li et al.
10,540,217 B2 *  1/2020   Jaiswal ............... G06F 9/546
(Continued)

FOREIGN PATENT DOCUMENTS

CN    103747060 A    4/2014
CN    106022874 A    10/2016
(Continued)

OTHER PUBLICATIONS

International search report for application No. PCT/CN2021/109241 dated Nov. 1, 2021.
(Continued)

*Primary Examiner* — Kim T Nguyen
(74) *Attorney, Agent, or Firm* — Dennemeyer & Associates LLC; Victoria Friedman (57) ABSTRACT

A data processing method and system for a cloud platform, and an electronic apparatus and a storage medium. The data processing method includes: an acquisition rate of performance data of each data type in a cloud platform is determined (S101); according to the acquisition rate, a shard corresponding to each data type is determined (S102); a database mapping table according to correspondence relationships between shards and databases is generated (S103); and when a data operation request is received, according to the database mapping table, a target database corresponding to the data operation request is determined, and a corre-
(Continued)

sponding operation in the target database is executed (S104). By using the above method, the load balancing of a cloud platform can be realized, and the data processing efficiency can be improved.

20 Claims, 3 Drawing Sheets

(51) Int. Cl.
*G06F 11/34* (2006.01)
*G06F 16/22* (2019.01)

(56) References Cited

U.S. PATENT DOCUMENTS

| | | | | |
|---|---|---|---|---|
| 11,567,969 | B2* | 1/2023 | Graefe | G06F 9/5061 |
| 2016/0085829 | A1 | 3/2016 | Jin et al. | |
| 2021/0275157 | A1* | 9/2021 | Pic | A61B 17/00491 |
| 2022/0327123 | A1* | 10/2022 | Ajmera | G06F 16/2455 |
| 2023/0009909 | A1* | 1/2023 | Porter | G06F 16/285 |
| 2023/0099501 | A1* | 3/2023 | Li | G06F 16/24534 |
| | | | | 707/713 |
| 2023/0289369 | A1* | 9/2023 | Zhang | G06F 16/27 |
| | | | | 707/674 |

FOREIGN PATENT DOCUMENTS

| | | |
|---|---|---|
| CN | 106648904 A | 5/2017 |
| CN | 109189785 A | 1/2019 |
| CN | 109981744 A | 7/2019 |
| CN | 111124309 A | 5/2020 |
| CN | 111177124 A | 5/2020 |
| CN | 111782640 A | 10/2020 |

OTHER PUBLICATIONS

Chinese office action for application No. 202010922963.2 filed on Sep. 4, 2020.

* cited by examiner

DATA PROCESSING METHOD AND SYSTEM FOR CLOUD PLATFORM, AND ELECTRONIC APPARATUS AND STORAGE MEDIUM

CROSS-REFERENCE TO RELATED APPLICATIONS

This is a 35 U.S.C. 371 National Stage Patent Application of International Application No. PCT/CN2021/109241, filed Jul. 29, 2021, which claims priority to Chinese application 202010922963.2, filed Sep. 4, 2020, each of which is hereby incorporated by reference in its entirety.

TECHNICAL FIELD

The present disclosure relates to the technical field of computers, in particular to a data processing method and system for a cloud platform, and an electronic apparatus and a storage medium.

BACKGROUND

A cloud platform, also referred to as a cloud computing platform, can provide computing, network and storage services on the basis of services of hardware resources and software resources.

With the continuous improvement of the scale of the cloud platform, it is increasingly important to achieve efficient inquiry and storage of large-scale monitoring data. In related technologies, centralized databases (such as stand-alone inflxuDB databases) are often used to store and inquire data. However, due to the continuous expansion of the data scale in the cloud platform, the centralized databases have been unable to carry large-scale monitoring data, resulting in reduced data reading and writing efficiency of the cloud platform.

Therefore, how to achieve load balancing of the cloud platform and improve the data processing efficiency is a problem that those skilled in the art need to solve at present.

SUMMARY

The present disclosure aims to provide a data processing method and system for a cloud platform, and a storage medium and an electronic apparatus, which can achieve load balancing of the cloud platform and improve the data processing efficiency.

In order to solve the above-mentioned problems, the present disclosure provides a data processing method for the cloud platform. The data processing method for the cloud platform includes:
   an acquisition rate of performance data of each data type in the cloud platform is determined;
   according to the acquisition rate, a shard corresponding to each data type is determined, wherein a difference between the total data acquisition rates corresponding to any two shards is within a preset range;
   a database mapping table according to correspondence relationships between shards and databases is generated, wherein the database mapping table includes a mapping relationship between the data types and the databases;
   when a data operation request is received, according to the database mapping table, a target database corresponding to the data operation request is determined, and a corresponding operation in the target database is executed.

In some embodiments, after the database mapping table according to correspondence relationships between shards and databases is generated, the method further includes:
   a corresponding data table in each database according to the database mapping table is established, wherein the data table is used for storing data of the data types corresponding to the databases.

In some embodiments, according to the database mapping table, the target database corresponding to the data operation request is determined, and the corresponding operation in the target database is executed includes:
   a target data table corresponding to the data operation request is determined, and the database including the target data table is used as candidate databases;
   the target database from the candidate databases is determined, and data reading and writing operations on the target data table of the target database are executed.

In some embodiments, the target database from the candidate databases is determined includes:
   all the candidate databases are used as the target databases when the data operation request is a data writing request;
   one candidate database is randomly selected as the target database when the data operation request is a data reading request.

In some embodiments, the target database from the candidate databases is determined includes:
   an abnormal database in an abnormal state in the candidate databases is determined, and the target database from all the candidate databases except the abnormal database is determined;
   correspondingly, the method further includes:
   when the data operation request is a data writing request, the data operation request is written into a local file, and forwarding, after the abnormal database is restored, the data operation request in the local file to the restored database to execute a corresponding data writing operation.

In some embodiments, the corresponding operation in the target database is executed includes:
   the data operation request is forwarded to the target database such that the target database executes data reading and writing operations corresponding to the data operation request;
   whether response information returned by the target database is received within preset time is determined;
   when the response information is received within the preset time, determined that the execution of the data reading and writing operations is completed;
   when the response information is not received within the preset time, the data operation request into a local file is written, and the target database is considered as the abnormal database;
   when it is detected that the target database is restored, the data operation request in the local file is forwarded to the target database such that the target database executes the data reading and writing operations corresponding to the data operation request.

In some embodiments, the database mapping table according to correspondence relationships between shards and databases is generated includes:
   a target shard is selected, and a database corresponding to the target shard is determined;

the correspondence relationship between the target shard and the data type as a correspondence relationship between the database corresponding to the target shard and the data type is taken, and the database mapping table is constructed;

whether all the data types have corresponding databases is determined;

when all the data types have corresponding databases, the construction of the database mapping table is completed is determined;

when exist a data type do not have corresponding databases, a new target shard is selected and the operation of determining a database corresponding to the target shard is executed.

The present disclosure further provides a data processing system for the cloud platform. The system includes:

an acquisition rate determining module is configured to determine an acquisition rate of performance data of each data type in the cloud platform;

a data sharding module is configured to determine a shard corresponding to each data type according to the acquisition rate, wherein a difference between the data acquisition rates corresponding to any two shards is within a preset range;

a mapping building module is configured to generate a database mapping table according to correspondence relationships between shards and databases, wherein the database mapping table includes a mapping relationship between the data types and the databases;

a data processing module is configured to: when a data operation request is received, determine a target database corresponding to the data operation request according to the database mapping table, and execute a corresponding operation in the target database.

The present disclosure further provides the storage medium which stores computer programs. The computer programs, when executed, implement the steps of the above data processing method for a cloud platform.

The present disclosure further provides the electronic apparatus, which includes a memory and a processor. The memory is configured to store computer programs, and the processor is configured to invoke the computer programs in the memory to implement the steps of the above data processing method for the cloud platform.

The present disclosure provides the data processing method for the cloud platform, including: the acquisition rate of performance data of each data type in the cloud platform is determined; according to the acquisition rate, the shard corresponding to each data type is determined, wherein a difference between the data acquisition rates corresponding to any two shards is within the preset range; the database mapping table according to correspondence relationships between shards and databases is generated, wherein the data mapping table includes the mapping relationship between the data types and the databases; and when the data operation request is received, according to the database mapping table, the target database corresponding to the data operation request is determined, and the corresponding operation in the target database is executed.

In the present disclosure, the shard corresponding to each data type is determined according to the acquisition rate of the performance data of each data type, so that the total data acquisition rates of any two shards can be close to achieve a data balance between the shards. Each shard can be stored to the corresponding database. In the present disclosure, the database mapping table is generated according to the correspondence relationships between the shards and the databases; the shard and database where each piece of performance data needs to be stored can be determined according to the database mapping table; and the target database corresponding to the data operation request can be determined according to the database mapping table, and the operation is executed. The present disclosure can achieve the load balancing of the cloud platform and improve the data processing efficiency. The present disclosure also provides the data processing system for the cloud platform, the electronic apparatus and the storage medium, which have the above beneficial effects, and descriptions thereof will be omitted.

BRIEF DESCRIPTION OF THE DRAWINGS

In order to describe the embodiments of the present invention or methods in the existing art more clearly, drawings required to be used in the embodiments or the illustration of the existing art will be briefly introduced below. Obviously, the drawings in the illustration below are only some embodiments of the present invention. Those ordinarily skilled in the art also can acquire other drawings according to the provided drawings without doing creative work.

DETAILED DESCRIPTION OF THE EMBODIMENTS

In order to make the objectives, technical schemes and advantages of the embodiments of the present disclosure clearer, the technical schemes in the embodiments of the present disclosure will be described clearly and completely below in combination with the drawings in the embodiments of the present disclosure. Apparently, the embodiments described are part of the embodiments of the present disclosure, not all the embodiments. Based on the embodiments in the present disclosure, all other embodiments obtained by those of ordinary skill in the art without creative work all fall within the protection scope of the present disclosure.

Figure 1:
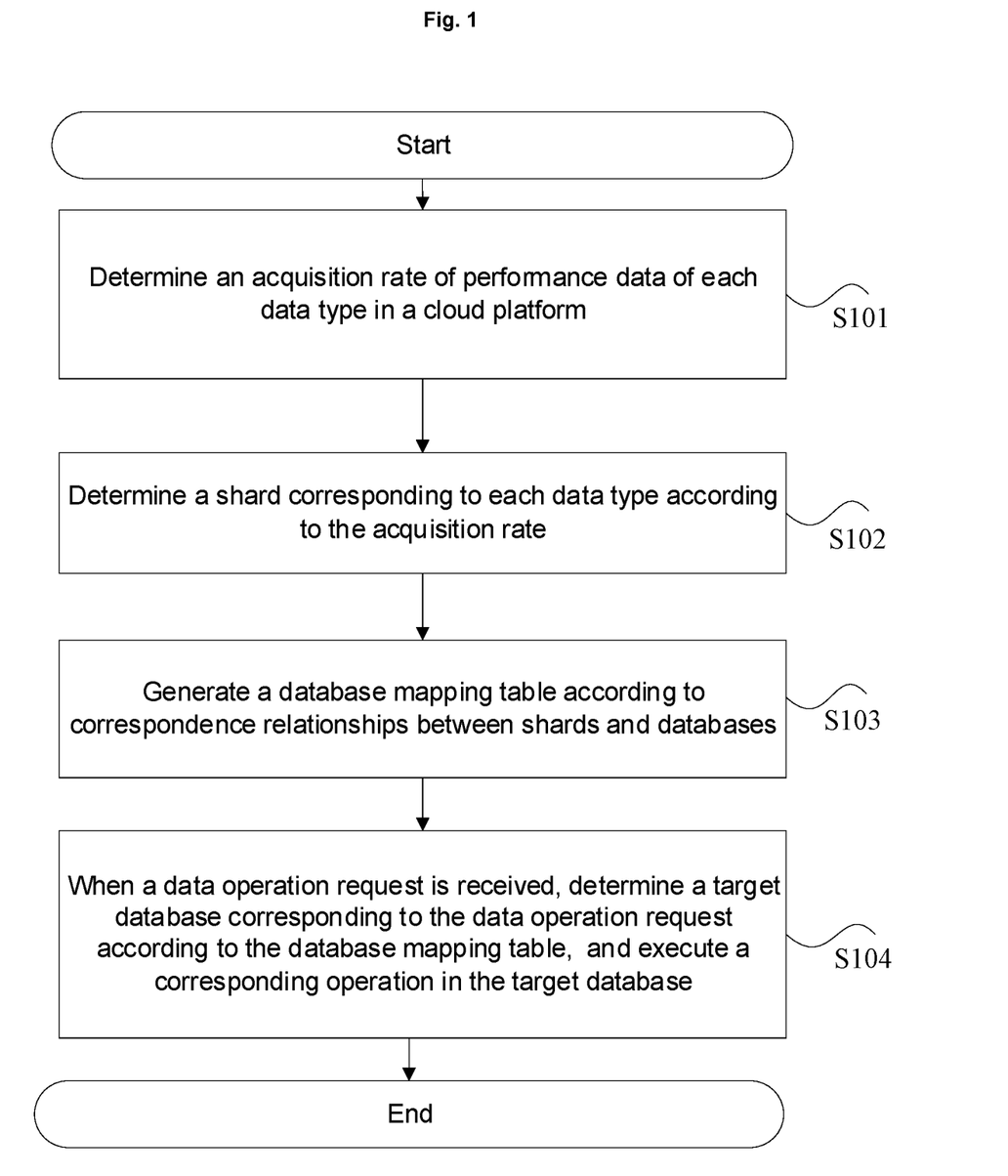
FIG. 1 is a flow chart of a data processing method for a cloud platform provided by an embodiment of the present disclosure.

Referring to FIG. 1 below, FIG. 1 is a flow chart of the data processing method for the cloud platform provided by an embodiment of the present disclosure.

Specific steps may be as follows:

at step S101: an acquisition rate of performance data of each data type in a cloud platform is determined.

This embodiment can be applied to a host node of the cloud platform. The cloud platform can include various kinds of performance data. Before the step S101, there may be an operation of classifying the performance data. For example, data types of the performance data may include central processing unit (CPU) information data, internal memory information, network card traffic data, magnetic disk reading and writing rate data, and the like. The acquisition rate refers to an acquisition rate for each type of performance data in the cloud platform. The acquisition rate is information for describing the number of pieces of performance data acquired within unit time. Referring to Table 1, Table 1 shows data acquisition rates provided by the embodiment of the present disclosure:

TABLE 1

Table of data acquisition rates

| Data type | Number of pieces of data within unit time (1 hour) |
| --- | --- |
| CPU information data (cpu) | 1000 |
| Internal memory information data (mem) | 1000 |
| Network card traffic data (net) | 2000 |
| Magnetic reading and writing rate data (diskio) | 4000 |

Since the acquisition cycle of the performance data of each data type is different, this embodiment can determine the number of pieces of data within unit time according to the least common multiple of all the data acquisition cycles (such as 24 hours).

At step S102: a shard corresponding to each data type is determined according to the acquisition rate.

On the basis of obtaining the acquisition rate of the performance data of each data type, this embodiment can determine the shard corresponding to each data type according to the acquisition rate and a preset rule, so that a difference between the total data acquisition rates corresponding to any two shards is within a preset range, thus load balancing between the shards is achieved. The total data acquisition rate of a shard is a sum of the acquisition rates of the performance data of all the data types corresponding to the shard. For example, the data types corresponding to shard0 include the CPU information data and the network card traffic data. The acquisition rate of the CPU information data is 1000 pcs/h, and the acquisition rate of the network card traffic data is 2000 pcs/h, so that the total data acquisition rate of shard0 is 3000 pcs/h.

This embodiment can determine the number of shards according to the scale of the cloud platform. For example, the number of shards can be determined according to the number of hosts, the number of cloud hosts, the type of acquired data and a data acquisition cycle. The number of copies in each shard is determined according to a data security requirement, that is, the number of InfluxDB databases in one shard. A table weight is determined according to a data volume per table unit time, and data sharding is performed by table.

At step S103: a database mapping table is generated according to correspondence relationships between shards and databases.

Each shard may include multiple databases, that is, the corresponding relationships between the shards and the databases exists in this embodiment. Referring to Table 2, Table 2 shows the corresponding relationships between the shards and the databases provided in the embodiment of the present disclosure, and the digits in the column of InfluxDB database in Table 2 represent addresses of the databases:

TABLE 2

Corresponding relationships between shards and databases

| Shard | InfluxDB database |
| --- | --- |
| Shard0 | 100.2.30.100 |
|  | 100.2.30.101 |
| Shard1 | 100.2.30.102 |
|  | 100.2.30.103 |

As shown in Table 2, when the data is divided into two shards (shard0 and shard1), the CPU information data, the internal memory information and network card traffic data belong to shard0, and the magnetic disk reading and writing rate data belongs to shard1. The InfluxDB database is taken as an example. The process of configuring the database may include the following step: the number of shards and the number of copies according to system design requirements are decided, since the total number of InfluxDB databases is obtained by multiplying the number of shards by the number of copies in each shard. For example, a larger data size indicates more shards. A large number of reading and writing requests and a high data security requirement can increase the number of copies. In Table 2, two data shards, each of which includes two InfluxDB databases, are taken as an example. Four InfluxDB databases are required in total. The generated database mapping table includes the mapping relationships between the data types and the databases. As shown in Table 3:

TABLE 3

Database mapping table

| Data type | InfluxDB database |
| --- | --- |
| CPU information data (cpu) | 100.2.30.100; 100.2.30.101 |
| Internal memory information data (mem) | 100.2.30.100; 100.2.30.101 |
| Network card traffic data (net) | 100.2.30.100; 100.2.30.101 |
| Magnetic reading and writing rate data (diskio) | 100.2.30.102; 100.2.30.103 |

Specifically, the process of the database mapping table is generated can include the following steps:

at step 1: a target shard is selected, and a database corresponding to the target shard is selected;

at step 2: the correspondence relationship between the target shard and the data type as a correspondence relationship between the database corresponding to the target shard and the data type is taken, and the database mapping table is constructed;

at step 3: whether all the data types have corresponding databases is determined; when all the data types have corresponding databases, the construction of the database mapping table is completed is determined; and when exist a data type do not have corresponding databases, a new target shard is selected, and the operation of determining a database corresponding to the target shard is executed in the step 1.

At step S104: when a data operation request is received, a target database corresponding to the data operation request is determined according to the database mapping table, and a corresponding operation is executed in the target database.

The database mapping table records the mapping relationships between the data types and the databases, so that the corresponding databases can be inquired according to the database mapping table when reading and writing operations need to be executed on specific types of data. Specifically, before the step S104, there may also be an operation of receiving the data operation request. The data operation request can be a reading request or a writing request. After the data operation request is received, the data operation request can be parsed to obtain a data type of data to be operated, and then the target database corresponding to the data operation request can be determined according to the mapping relationship between the data type and the database in the database mapping table, so that the data reading and writing operations corresponding to the data operation request can be executed in the target database.

In this embodiment, the shard corresponding to each data type is determined according to the acquisition rate of the performance data of each data type, so that the total data acquisition rates of any two shards can be close to achieve a data balance between the shards. Each shard can be stored to the corresponding database. In this embodiment, the database mapping table is generated according to the correspondence relationships between the shards and the databases; the shard and database where each piece of performance data needs to be stored can be determined according to the database mapping table; and the target database corresponding to the data operation request can be determined according to the database mapping table, and the operation is executed. This embodiment can achieve the load balancing of the cloud platform and improve the data processing efficiency.

As a further introduction of the corresponding embodiment of FIG. 1, after the database mapping table is generated according to the corresponding relationships between the shards and the databases in the step S103, a corresponding data table can also be established in each database according to the database mapping table. The data table is used for storing data of the data types corresponding to the databases.

For example, shard0 corresponds to the CPU information data, the internal memory information data and the network card traffic data. Shard 0 includes a first database and a second database. Shard 1 corresponds to the magnetic disk reading/writing rate data. Shard 1 includes a third database and a fourth database. This embodiment can establish, in the first database, the data table for storing the CPU information data, a data table for storing the internal memory information data, and a data table for storing the network card traffic data, can also establish, in the second database, a data table for storing the CPU information data, a data table for storing the internal memory information data, and a data table for storing the network card traffic data, can also establish, in the third database, a data table for storing the magnetic disk reading/writing rate data, and can also establish, in the fourth database, a data table for storing the magnetic disk reading/writing rate data. After the above data tables for storing the performance data of each data type are established in the various databases, when the data operation request is received, the data type corresponding to the data operation request can be obtained by parsing the data operation request, and then a target data table corresponding to the data operation request can be determined from all the data tables; the databases including the target data table are taken as candidate databases; and the target database is determined from the candidate databases, and data reading and writing operations are executed on the target data table of the target database.

In a feasible implementation, the process of the target database from the candidate databases is determined can include: all the candidate databases are used as the target databases when the data operation request is a data writing request; and one candidate database is randomly selected as the target database when the data operation request is a data reading request. Further, the target database selected in this embodiment can be a database in a normal state, so the process of the target database from the candidate databases is determined may be: an abnormal database in an abnormal state in the candidate databases is determined, and the target database from all the candidate databases except the abnormal database is determined; correspondingly, when the data operation request is a data writing request, the data operation request is written into a local file, and forwarding, after the abnormal database is restored, the data operation request in the local file to the restored database to execute a corresponding data writing operation.

Figure 2:
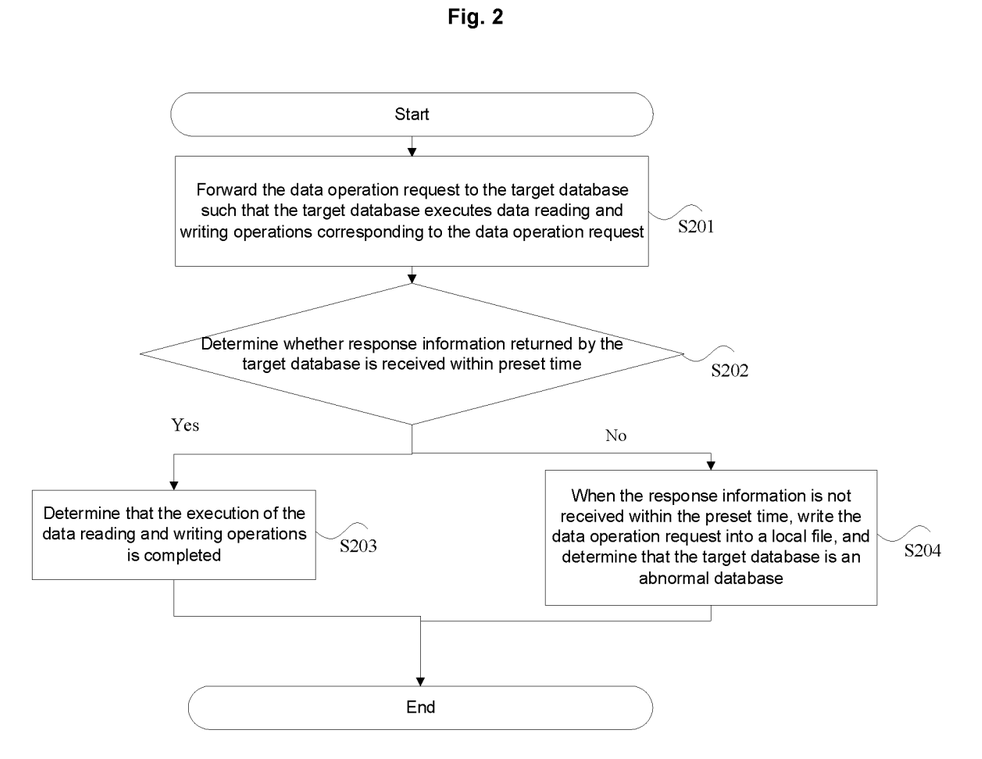
FIG. 2 is a flow chart of an execution method for data reading and writing operations provided by an embodiment of the present disclosure.

Referring to FIG. 2, FIG. 2 is a flow chart of an execution method for data reading and writing operations provided by an embodiment of the present disclosure. This embodiment is a further introduction of the step S104 in the corresponding embodiment of FIG. 1: the corresponding operation is in the target database. This embodiment can be combined with the corresponding embodiment of FIG. 1 to obtain a further implementation. This embodiment can include the following steps:

at step S201: the data operation request is forwarded to the target database such that the target database executes data reading and writing operations corresponding to the data operation request.

At step S202: whether response information returned by the target database is received within preset time is determined; when the response information is received within the preset time, S203 is executed; and when the response information is not received within the preset time, S204 is executed.

At step S203: it is determined that the execution of the data reading and writing operations is completed.

At step S204: the data operation request is written into a local file, and it is determined that the target database is an abnormal database.

The data reading and writing operations include the data writing operations and/or the data reading operation. When the target database is in a normal state, the target database can return the response information after receiving the data operation request. When the target database does not return the response information within the preset time, it is determined to write the data operation request into the local file, and it is determined that the target database is the abnormal database. Further, when it is detected that the target database is restored, the data operation request in the local file is forwarded to the target database such that the target database executes the data reading and writing operations corresponding to the data operation request.

The following describes the flow described in the above embodiment by the embodiments in practical disclosures. This embodiment provides a data processing method for a distributed timing database cluster. This embodiment can be applied to a Loongson processor or a Qilin operating system. This embodiment achieves sharding of monitoring data: the performance data includes the CPU information data, the internal memory information, the network card traffic data, the magnetic disk reading/writing rate data, etc. Each type of data corresponds to one table in the database. The data is divided into shards according to a table granularity. A weight is calculated according to a data volume per unit tale time to achieve a data balance between the shards. This embodiment maintains the mapping between the tables and the data shards. Each shard corresponds to one or more InfluxDB timing databases. For the received data request, this embodiment quickly parses the corresponding data table in the data request, finds the corresponding InfluxDB timing database according to the table and shard mapping relationship, and forwards the data request. This embodiment can also support the load balancing and data disaster recovery of the timing databases. Each shard supports multiple InfluxDB timing databases. During data writing, the data is written into the multiple InfluxDB databases at the same time. During data reading, data is read randomly from one InfluxDB database, thus the load balancing of the read data is achieved. Meanwhile, when a service of one InfluxDB data is abnormal or the data is lost, other InfluxDB databases can work normally to achieve data disaster recovery processing. When the InfluxDB database is abnormal, in order to ensure that the data is not lost, the data is written into the local file; and a data writing request is re-initiated after recovery, which improves the data security.

The data processing method for the distributed timing database cluster provided in this embodiment can achieve data sharding, high-performance data forwarding, load balancing and data disaster recovery. The specific implementation process is as follows:

a data sharding component can achieve data sharding of monitoring data by table granularity. A data weight of each table is calculated. For example, a weight ratio of the CPU information data, the internal memory information data, the network card traffic data and the magnetic disk reading/writing rate data is 1:1:2:4. When there are two data shards, the CPU information data, the internal memory information and the network card traffic data belong to shard0. The magnetic disk reading/writing rate data belongs to shard1. In the process of configuring the InfluxDB database, the number of shards and the number of copies can be decided according to system design requirements since the total number of InfluxDB databases is obtained by multiplying the number of shards by the number of copies in each shard. For example, a larger data size indicates more shards. A large number of reading and writing requests and a high data security requirement can increase the number of copies. Two data shards, each of which corresponds to two InfluxDB databases, are taken as an example, so four InfluxDB databases are required in total. Shard 0 includes the first database and the second database, while shard1 includes the third database and the fourth database. The mapping relationship between the data types and the databases can be as follows: the CPU information data, the internal memory information and the network card traffic data are stored in the first database; the CPU information data, the internal memory information and the network card traffic data are stored in the second database; the magnetic disk reading/writing rate data is stored in the third database; and the magnetic disk reading/writing rate data is stored in the fourth database.

The process of load balancing can include: the data operation request to obtain a table name is parsed, and addresses of the InfluxDB databases according to the database mapping table is acquired. When the data operation request is a writing operation, the request is forwarded to all the InfluxDB databases. When the data operation request is a reading operation, the request is forwarded randomly to one InfluxDB database. A data caching process includes: when an InfluxDB database is abnormal, in order to ensure that the data is not lost, the data is written into a local file, and a data writing request after the recovery of the InfluxDB database is re-initiated. A data disaster recovery process includes: available statuses of all the InfluxDB databases are recorded. When one InfluxDB database is abnormal, the following processing is performed: step a. the request is forwarded to a normal InfluxDB database in the shard when a writing operation is required; and a data caching operation on the abnormal InfluxDB database is executed; step b. the request is randomly forwarded to one normal InfluxDB database when a reading operation is required; and step c. whether the abnormal InfluxDB database is recovered is periodically detected, after recovery, the cached data is sent, and the available status of the InfluxDB database is modified.

This embodiment provides a timing database distributed cluster solution applied to a home-made cloud platform monitoring system, which realizes a distributed timing database cluster supporting large-scale monitoring of data in the cloud platform, supports data sharding, high-performance data forwarding, data caching, load balancing and data disaster recovery, and improves the data by put and system stability of the monitoring system.

Figure 3:
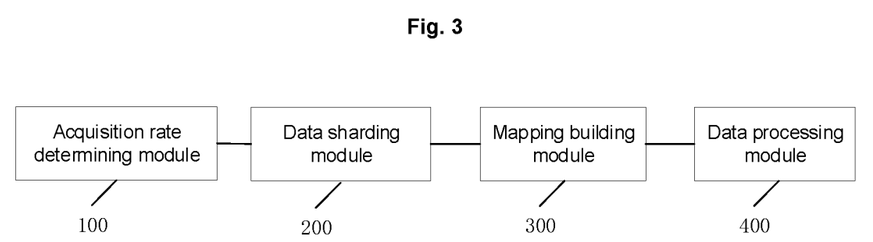
FIG. 3 is a schematic structural diagram of a data processing system for a cloud platform provided by an embodiment of the present disclosure.

Referring to FIG. 3, FIG. 3 is a schematic structural diagram of a data processing system for the cloud platform provided by an embodiment of the present disclosure.

The system may include:
an acquisition rate determining module 100 is configured to determine an acquisition rate of performance data of each data type in a cloud platform;
a data sharding module 200 is configured to determine a shard corresponding to each data type according to the acquisition rate, wherein a difference between the data acquisition rates corresponding to any two shards is within a preset range;
a mapping building module 300 is configured to generate a database mapping table according to correspondence relationships between shards and databases, wherein the database mapping table includes a mapping relationship between the data types and the databases;
a data processing module 400 is configured to: when a data operation request is received, determine a target database corresponding to the data operation request according to the database mapping table, and execute a corresponding operation in the target database.

In this embodiment, the shard corresponding to each data type is determined according to the acquisition rate of the performance data of each data type, so that the total data acquisition rates of any two shards can be close to achieve a data balance between the shards. Each shard can be stored to the corresponding database. In this embodiment, the database mapping table is generated according to the correspondence relationships between the shards and the databases; the shard and database where each piece of performance data needs to be stored can be determined according to the database mapping table; and the target database corresponding to the data operation request can be determined according to the database mapping table, and the operation is executed. This embodiment can achieve the load balancing of the cloud platform and improve the data processing efficiency.

Further, the data processing system further includes:
a data table establishment module is configured to: after the database mapping table is generated according to the corresponding relationships between the shards and the databases, establish a corresponding data table in each database according to the database mapping table, wherein the data table is used for storing data of the data types corresponding to the databases.

Further, the data processing module 400 includes:
a candidate database selection unit is configured to determine the target data table corresponding to the data operation request, and take databases that include the target data table as candidate databases;
a reading and writing unit is configured to determine the target database from the candidate databases, and execute data reading and writing operations on the target data table of the target database.

Further, the reading and writing unit is configured to take all the candidate databases as the target databases when the data operation request is a data writing request, and is also configured to randomly select one candidate database as the target database when the data operation request is a data reading request.

Further, the reading and writing unit is configured to determine an abnormal database in an abnormal state in the candidate databases, and determine the target database from all the candidate databases except the abnormal database.

Correspondingly, the data processing system further includes:

a caching unit is configured to: when the data operation request is a data writing request, write the data operation request into a local file, and forward, after the abnormal database is restored, the data operation request in the local file to the restored database to execute a corresponding data writing operation.

Further, the data processing module 400 is configured to forward the data operation request to the target database such that the target database executes data reading and writing operations corresponding to the data operation request; the data processing module 400 is also configured to determine whether response information returned by the target database is received within preset time; when the response information is received within the preset time, determine that the execution of the data reading and writing operations is completed; when the response information is not received within the preset time, write the data operation request into a local file, and determine that the target database is an abnormal database; and the data processing module 400 is also configured to: when it is detected that the target database is restored, forward the data operation request in the local file to the target database such that the target database executes the data reading and writing operations corresponding to the data operation request.

Further, the mapping building module 300 is configured to select a target shard, and determine a database corresponding to the target shard; the mapping building module 300 is also configured to take the correspondence relationship between the target shard and the data type as a correspondence relationship between the database corresponding to the target shard and the data type, and construct the database mapping table; and the mapping building module 300 is also configured to determine whether all the data types have corresponding databases; when all the data types have corresponding databases, determine that the construction of the database mapping table is completed; and when exist a data type do not have corresponding databases, select a new target shard, and execute the operation of determining a database corresponding to the target shard.

The embodiment of the system part corresponds to the embodiment of the method part, so that the embodiment of the system part refers to the description of the embodiment of the method part, and repeated descriptions will be omitted here.

The present disclosure also provides a storage medium which stores computer programs. The computer programs, when executed, can implement the steps provided in the above-mentioned embodiment. The storage medium includes: a USB flash disk, a mobile hard disk, a read-only memory (ROM), a random access memory (RAM), a magnetic disk or an optical disk, and other media that can store program codes.

The present disclosure also provides an electronic apparatus, which includes a memory and a processor. The memory stores computer programs, and the processor can invoke the computer program in the memory to implement the steps provided in the above-mentioned embodiment. Of course, the electronic apparatus may also include various network interfaces, power supplies, and other assemblies.

All the embodiments in the specification are described in a progressive manner. Contents mainly described in each embodiment are different from those described in other embodiments. Same or similar parts of all the embodiments refer to each other. The system disclosed by the embodiments is relatively simply described as it corresponds to the method disclosed by the embodiments, and related parts refer to part of the descriptions of the method. It should be pointed out that for those skilled in the art, without departing from the principle of the present disclosure, several improvements and modifications can also be made to the present disclosure, and these improvements and modifications also fall within the protection scope of the claims of the present disclosure.

It should be noted that in this specification, relational terms such as first and second are used merely to distinguish one entity or operation from another entity or operation, instead of necessarily requiring or implying that these entities or operations have any of these actual relationships or orders. Furthermore, terms "include", "including" or any other variants are meant to cover non-exclusive inclusions, so that a process, method, object or apparatus that includes a series of elements not only includes those elements, but also includes other elements which are not definitely listed, or further includes inherent elements of this process, method, object or apparatus. Without more restrictions, elements defined by a sentence "includes a/an . . . " do not exclude that the process, method, object or apparatus that includes the elements still includes other identical elements.

What is claimed is:

1. A data processing method for a cloud platform, comprising:

determining an acquisition rate of performance data of each data type in a cloud platform; wherein, data types of the performance data include central processing unit (CPU) information data, internal memory information, network card traffic data, magnetic disk reading and writing rate data;

determining a shard corresponding to each data type according to the acquisition rate, wherein a difference between the total data acquisition rates corresponding to any two shards is within a preset range;

generating a database mapping table according to correspondence relationship between shards and databases, wherein the database mapping table comprises a mapping relationship between the data types and the databases; and when a data operation request is received, determining a target database corresponding to the data operation request according to the database mapping table, and executing a corresponding operation in the target database.

2. The data processing method as claimed in claim 1, wherein after the database mapping table according to correspondence relationships between shards and databases is generated, the method further comprises:

establishing a corresponding data table in each database according to the database mapping table, wherein the data table is used for storing data of the data types corresponding to the databases.

3. The data processing method as claimed in claim 2, wherein determining the target database corresponding to the data operation request according to the database mapping table, and executing the corresponding operation in the target database comprises:

determining a target data table corresponding to the data operation request, and taking databases that comprise the target data table as candidate databases; and determining the target database from the candidate databases, and executing data reading and writing operations on the target data table of the target database.

4. The data processing method as claimed in claim 3, wherein determining the target database from the candidate databases comprises:
taking all the candidate databases as the target databases when the data operation request is a data writing request; and
randomly selecting one candidate database as the target database when the data operation request is a data reading request.

5. The data processing method as claimed in claim 3, wherein the determining the target database from the candidate databases comprises:
determining an abnormal database in an abnormal state in the candidate databases, and determining the target database from all the candidate databases except the abnormal database; and
correspondingly, the method further comprises:
when the data operation request is a data writing request, writing the data operation request into a local file, and forwarding, after the abnormal database is restored, the data operation request in the local file to the restored database to execute a corresponding data writing operation.

6. The data processing method as claimed in claim 5, wherein after the corresponding operation in the target database is executed comprises:
recording status of each database;
when one database is abnormal, forwarding the data operation request to a normal database in shard corresponding to the abnormal database when the data operation is a writing operation request, and writing the data operation request into the local file; and
randomly forwarding the one normal database when the data operation request is a reading operation request.

7. The data processing method as claimed in claim 6, wherein after the data operation request is written into a local file comprises:
periodically detecting whether the abnormal database is recovered; and
after the abnormal database is restored, modifying status the abnormal database, and forwarding the data operation in the local file to the abnormal database.

8. The data processing method as claimed in claim 3, wherein determining the target data table corresponding to the data operation request comprises:
determining a data type that corresponds to the data operation request; and
determining the target data table corresponding to the data operation request according to the data type.

9. The data processing method as claimed in claim 1, wherein the executing the corresponding operation in the target database comprises:
forwarding the data operation request to the target database such that the target database executes data reading and writing operations corresponding to the data operation request;
determining whether response information returned by the target database is received within preset time;
when the response information is received within the preset time, determining that the execution of the data reading and writing operations is completed;
when the response information is not received within the preset time, writing the data operation request into a local file, and determining that the target database is an abnormal database; and
when it is detected that the target database is restored, forwarding the data operation request in the local file to the target database such that the target database executes the data reading and writing operations corresponding to the data operation request.

10. The data processing method as claimed in claim 1, wherein the generating the database mapping table according to correspondence relationships between shards and databases comprises:
selecting a target shard, and determining a database corresponding to the target shard;
taking the correspondence relationship between the target shard and the data type as a correspondence relationship between the database corresponding to the target shard and the data type, and constructing the database mapping table;
determining whether all the data types have corresponding databases;
when all the data types have corresponding databases, determining that the construction of the database mapping table is completed; and
when exist a data types do not have corresponding databases, selecting a new target shard, and executing the operation of determining a database corresponding to the target shard.

11. The data processing method as claimed in claim 1, wherein before the acquisition rate of performance data of each data type in the cloud platform is determined comprises:
determining performance data of the each data type by classify performance data, wherein the data types include central processing unit information data, internal memory information, network card traffic data, magnetic disk reading and writing rate data.

12. The data processing method as claimed in claim 1, wherein determining the acquisition rate of performance data of each data type in the cloud platform comprises:
determining an acquisition cycle of the performance data of each data type; and
determining the acquisition rate of performance data of each data type in the cloud platform according to the acquisition cycle.

13. The data processing method as claimed in claim 1, wherein before the shard corresponding to each data type according to the acquisition rate is determined comprises:
determining the number of shards in the cloud platform according to the number of hosts, the number of cloud hosts, the type of acquired data and a data acquisition cycle.

14. The data processing method as claimed in claim 1, wherein after the data operation request is received comprises:
determining a data type that corresponds to the data operation request by parsing the data operation request.

15. An electronic apparatus, comprising a memory and a processor, wherein the memory is configured to store computer programs, and the processor is configured to execute the computer program to:
determine an acquisition rate of performance data of each data type in a cloud platform; wherein, data types of the performance data include central processing unit (CPU) information data, internal memory information, network card traffic data, magnetic disk reading and writing rate data;
determine a shard corresponding to each data type according to the acquisition rate, wherein a difference between the total data acquisition rates corresponding to any two shards is within a preset range;

generate a database mapping table according to corresponding relationship between shards and databases, wherein the database mapping comprises a mapping relationship between the data types and the databases, and when a data operation request is received, determine a target database corresponding to the data operation request according to the database mapping table, and execute a corresponding operation in the target database.

16. The electronic apparatus as claimed in claim 15, the processor is further configured to execute the computer program to:

establish a corresponding data table in each database according to the database mapping table, wherein the data table is used for storing data of the data types corresponding to the databases.

17. The electronic apparatus as claimed in claim 16, the processor is further configured to execute the computer program to:

determine a target data table corresponding to the data operation request, and take databases that comprise the target data table as candidate databases; and determine the target database from the candidate databases, and execute data reading and writing operations on the target data table of the target database.

18. The electronic apparatus as claimed in claim 17, the processor is further configured to execute the computer program to:

take all the candidate databases as the target databases when the data operation request is a data writing request; and randomly select one candidate as the target database when the data operation request is a data reading request.

19. The electronic apparatus as claimed in claim 16, the processor is further configured to execute the computer program to:

determine an abnormal database in an abnormal state in the candidate databases, and determine the target database from all the candidate databases except the abnormal database; and correspondingly, the method further comprises:

when the data operation request is a data writing request, write the data operation request into a local file, and forward, after the abnormal database is restored, the data operation request in the local file to the restored database to execute a corresponding data writing operation.

20. A non-transitory storage medium, wherein the storage medium is configured to store computer executable instructions; and the computer executable instructions, when loaded and executed by a processor, cause the processor to:

determine an acquisition rate of performance data of each data type in a cloud platform; wherein, data types of the performance data include central processing unit (CPU) information data, internal memory information, network card traffic data, magnetic disk reading and writing rate data;

determine a shard corresponding to each data type according to the acquisition rate, wherein a difference between the total data acquisition rates corresponding to any two shards is within a preset range;

generate a database mapping table according to correspondence relationship between shards and databases, wherein the database mapping table comprises a mapping relationship between the data types and the databases; and when a data operation request is received, determine a target database corresponding to the data operation request according to the database mapping table, and execute a corresponding operation in the target database.

* * * * *

UNITED STATES PATENT AND TRADEMARK OFFICE
CERTIFICATE OF CORRECTION

PATENT NO. : 11,960,506 B2  
APPLICATION NO. : 18/013517  
DATED : April 16, 2024  
INVENTOR(S) : Lianfa Zhang Page 1 of 1

It is certified that error appears in the above-identified patent and that said Letters Patent is hereby corrected as shown below:

On the Title Page

Item (22), please correct the PCT filing date from July 26, 2021 to July 29, 2021.

Signed and Sealed this  
Twenty-first Day of January, 2025

Coke Morgan Stewart  
*Acting Director of the United States Patent and Trademark Office*